Dec. 6, 1960     L. D. STATHAM     2,963,244
ANGULAR ACCELEROMETER AND SWITCH
Filed May 24, 1954                  2 Sheets-Sheet 1

INVENTOR.
LOUIS D. STATHAM
BY
ATTORNEY.

Dec. 6, 1960 L. D. STATHAM 2,963,244
ANGULAR ACCELEROMETER AND SWITCH
Filed May 24, 1954 2 Sheets-Sheet 2
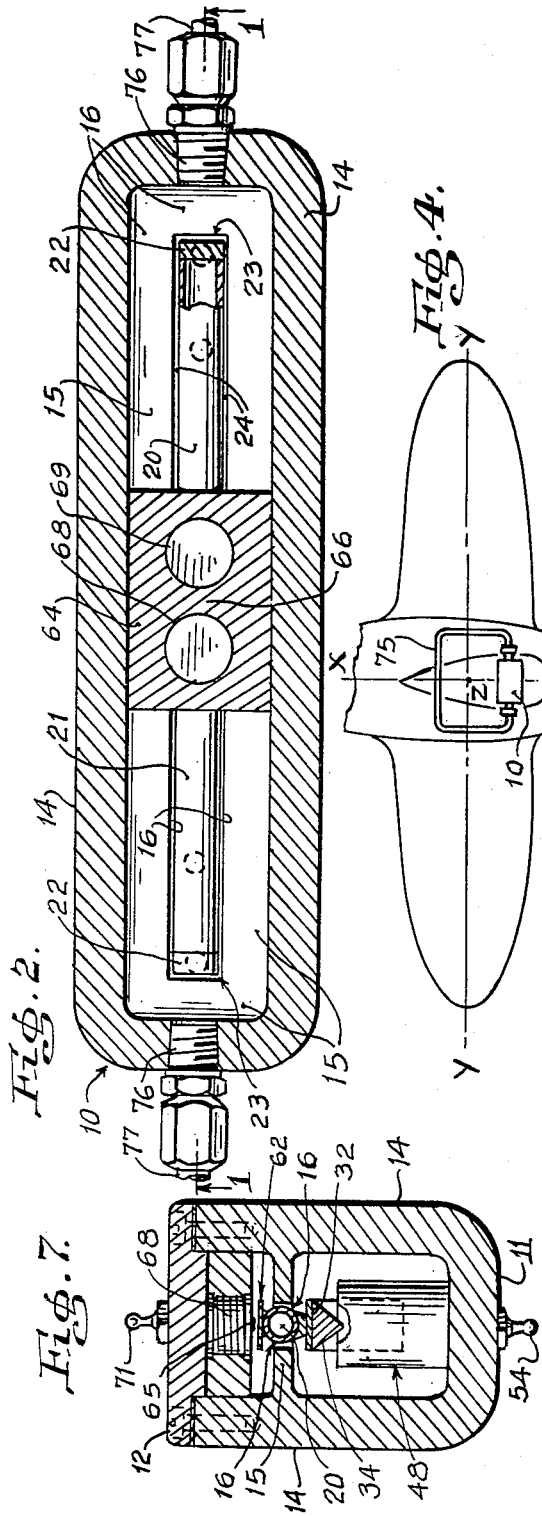
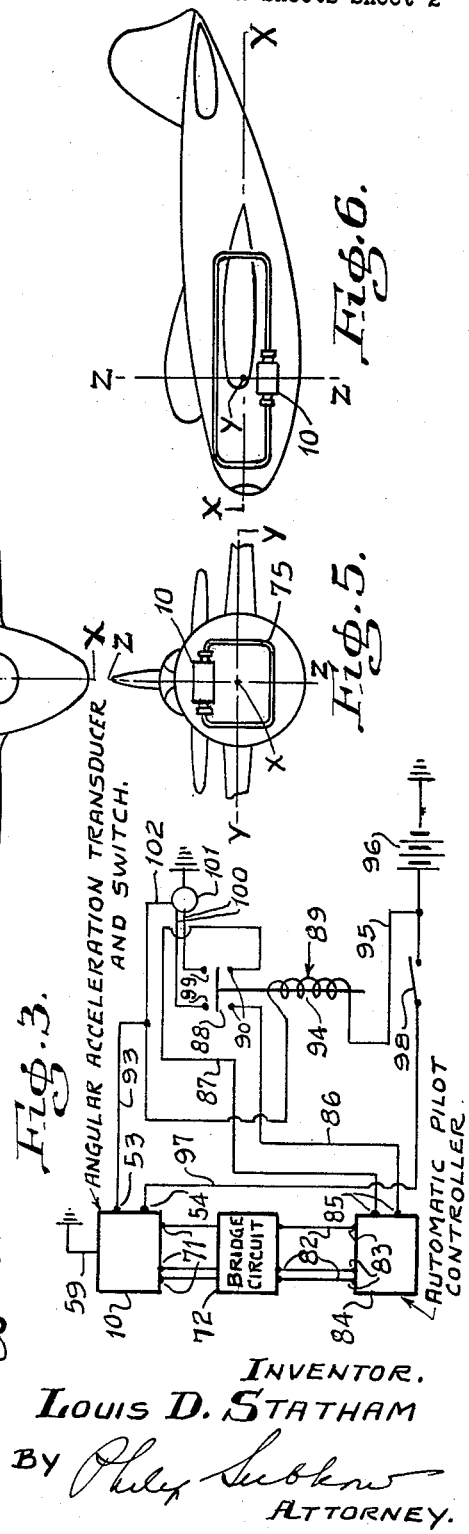
INVENTOR.
Louis D. Statham
BY
ATTORNEY.

United States Patent Office 2,963,244
Patented Dec. 6, 1960

2,963,244
ANGULAR ACCELEROMETER AND SWITCH

Louis D. Statham, Beverly Hills, Calif., assignor to Statham Instruments, Inc., a corporation of California Filed May 24, 1954, Ser. No. 431,760

20 Claims. (Cl. 244—77)

This application is a continuation-in-part of application Serial Nos. 241,539, filed August 13, 1951, now Patent No. 2,778,539, 328,416, filed December 29, 1952, and filed of even date herewith, now Patent No. 2,778,623.

This invention relates to novel mechanism for preferably controlling the automatic pilot control of an airplane, and is more particularly concerned with novel structure including an angular accelerometer and a switch for this purpose.

In airplanes employing an automatic pilot, if the craft is suddenly subjected to an undesirable maneuver such as rolling, yawing or pitching, due to ineffective operation of the automatic pilot, the extent of the maneuver may become dangerously great before the pilot is made aware of it and has been able to make the proper adjustment to stop such maneuvers. It is an object of this invention to devise a device which will ordinarily control the action of the automatic pilot to correct for mild rolling, yawing or pitching of the craft, and in the event the automatic pilot fails in such a manner that the airplane maneuvers in the aforementioned undesirable manner, to interrupt the action of the automatic pilot as soon as the aforementioned maneuvers approach a serious magnitude. It is a further object of my invention to immediately warn the pilot so that he can take the proper steps to alleviate the latter serious conditions before they take on dangerous proportions.

Rolling, yawing and pitching of an aircraft result from accelerations of the craft about the respective principal axes thereof. Hence the device of the invention is designed to respond to angular accelerations of an aircraft about these axes, and which embodies a switch mechanism for cutting out the automatic pilot at a predetermined angular acceleration about such respective axes. While the invention device is of particular value for controlling the automatic pilot on an airplane, it may be used for controlling the movements of any vehicle.

In my above copending applications I have described motion responsive devices such as accelerometers for indicating and recording the magnitude and nature of motions of an object in space. In the devices of the said applications, I employ a liquid mass and provide means sensitive to the displacement of the liquid mass relative to the container subjected to the motion to be sensed, instead of using a solid mass suspended on springs, whereby the nature and character of the displacement of the mass on the springs are a measure of the magnitude and nature of the motion.

My above applications disclose devices wherein a paddle is mounted in the container so that the paddle may pivot. As a result of the relative motion of the liquid and container, a couple is thus created which causes the paddle to pivot on its axis and this motion may be sensed by any suitable motion sensing device.

The device of the instant invention preferably embodies an accelerometer operating on the same principle as above described with respect to the devices of my copending applications, in combination with novel switch structure for discontinuing operation of a control means, which is normally actuated in response to the motion of said accelerometer mechanism, when such motion reaches a predetermined maximum. A means is also provided for opening said switch and again placing said control means in operation under the influence of the accelerometer. The control means may be an automatic pilot controller for an aircraft or a controller for any vehicle whose motion is under the control of an automatic device such as an automatic pilot.

Accordingly, an object of this invention is the provision of a device which embodies the combination of an angular accelerometer and a switch connected to said accelerometer.

Another object of the invention is to provide a device of the foregoing type which operates an automatic pilot controller on an airplane, or an automatic control for any vehicle, the switch functioning to interrupt the action of the automatic pilot controller in response to a predetermined motion of said angular accelerometer.

Another object is to afford structure embodying the use of an accelerometer to actuate a vehicle or automatic pilot control.

Yet another object is the provision of a novel switch mechanism which is responsive to acceleration to discontinue the action of an automatic vehicle control such as an automatic airplane pilot.

A still further aim of the invention is to provide an accelerometer employing a liquid mass as the effective mass, i.e., substantially the entire inertial mass, and which makes use of a liquid loop for increasing the sensitivity of the system to low values of angular acceleration.

Another aim of the invention is to provide a novel accelerometer mechanism containing an inertial mass which may be operatively positioned for rotation on the major axes of an airplane for controlling the rate of angular acceleration about such axes.

Yet another object is to afford devices of the foregoing type which are sturdy and reliable in operation, yet are comparatively simple and inexpensive.

These objects and advantages are accomplished in accordance with the invention by a device including an accelerometer, in the form of a container in which is positioned a liquid mass which acts as the effective inertial mass of the accelerometer. A preferably buoyant paddle, i.e. one whose mass is substantially equal to the volume of the liquid it displaces, is resiliently mounted so as to be immersed in the liquid when the case or container is subjected to an angular acceleration, the inertial forces causing the liquid to be displaced with respect to the container and to develop a pressure against the paddle. The paddle is deflected angularly until the restraint offered by the resilient mounting balances the forces on the paddle. The pivotal motion of the paddle resulting from relative movement of the liquid and container is sensed by a motion sensing means such as an inductive type transducer.

An external liquid-containing loop communicating with the interior of the container is mounted thereon in a plane normal to the axis of rotation of the paddle. The purpose of such loop is to increase the sensitivity of the accelerometer. Thus, the larger the diameter of the loop, the lower will be the angular acceleration required per unit of angular displacement of the paddle. That is, the greater the loop, the greater the displacement of the paddle for any given value of angular acceleration. The size of the loop, i.e., its diameter if a circular loop, or its length and width if rectangular in shape, can be much greater than the dimensions of the liquid-containing chamber, and may be made of any size desired to give the desired sensitivity referred to above. Damping is provided as a result of the viscous drag of the liquid in the container and loop, and also by means of a restricted orifice interposed in the path of the liquid. The net effect of the conjoint action of the orifice and the additional path in the container is such as to reduce the variation in damping coefficient resulting from changes in viscosity of the liquid with changes of temperature.

The accelerometer device of the invention may be positioned on one of the major axes of an airplane to control acceleration about such axis.

Also mounted within the accelerometer container is a switch comprising a pair of magnetic contacts mounted adjacent the ends of the paddle. When the paddle touches one of these contacts, a circuit is closed discontinuing the action of the automatic pilot and alerting the airplane pilot. A reset switch enables the pilot to open such circuit by urging the paddle away from the contact against which it is held to allow the automatic pilot to regain control of the craft.

For purposes of illustration, a preferred embodiment of the invention is described below, taken in connection with the accompanying drawing wherein:

Fig. 2 is a partly broken section on line 2—2 of Fig. 1;

Fig. 3 is a schematic illustration of a circuit for actuating the automatic pilot control of an airplane, including the device of Figs. 1 and 2;

Fig. 4 is a schematic plan view of an airplane, showing the invention device operatively positioned about one axis of the craft;

Fig. 5 is a schematic front view of an airplane, showing the invention device operatively positioned about another axis of the craft;

Fig. 6 is a schematic side elevation of an airplane showing the invention device operatively positioned about a third axis of the aircraft; and Fig. 7 is a section taken on line 7—7 of Fig. 1.

Figure 1:
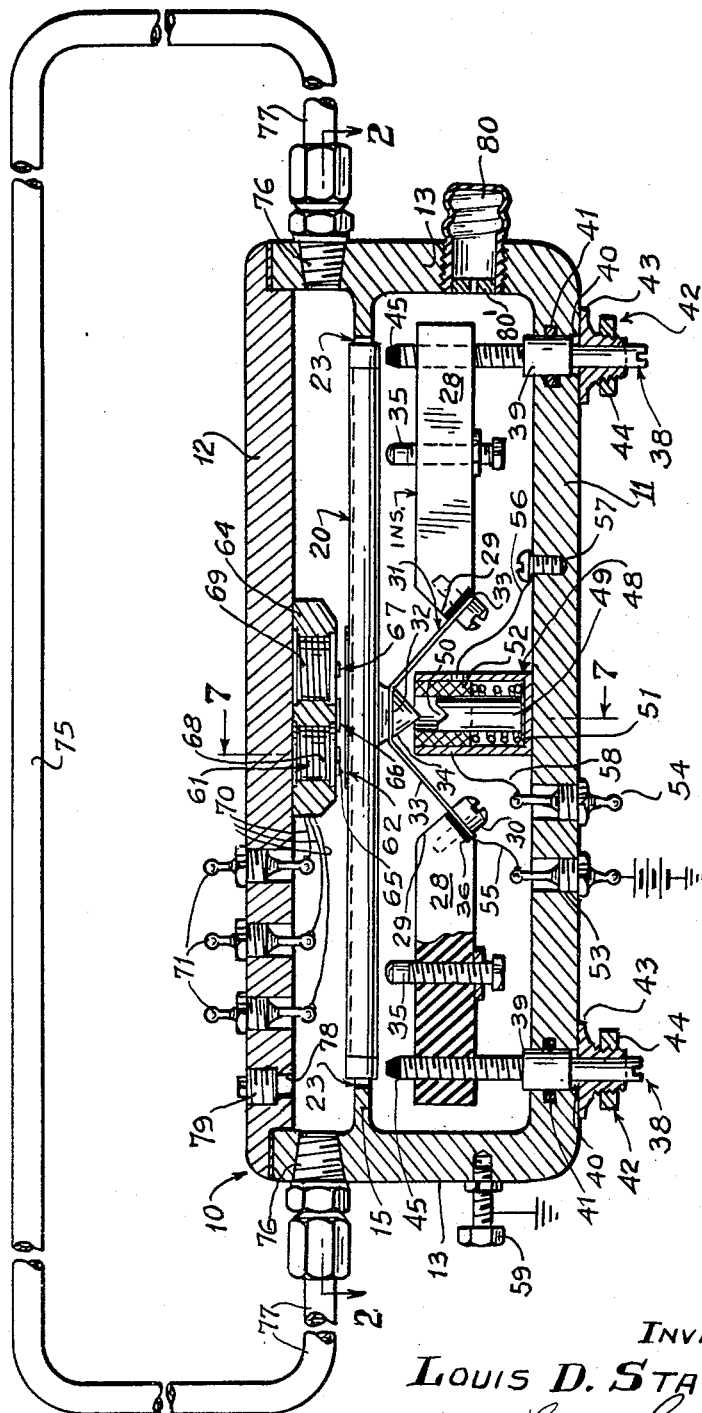
Fig. 1 is a vertical section of the device, taken along the line 1—1 of Fig. 2, certain parts being shown in full lines for clarity.

The container 10 is shown to be of oblong shape, but may be of any suitable shape provided it is a closed container. The container is closed by a bottom 11, top 12, side walls 13 and front and rear walls 14. Intermediate the bottom and top of the container, and integral with the walls 13 and 14 thereof is positioned a flange or plate 15 having a centrally positioned slot 16 extending longitudinally of the container, the ends of the slot being disposed adjacent the inner surfaces of side walls 13.

Positioned in slot 16 is a buoyant paddle 20 extending longitudinally of the container. The mass of the suspended paddle when immersed in the liquid is made negligible. The paddle is preferably in the form of a hollow cylinder 21 with the ends sealed by caps 22. However, a paddle of any structural shape or configuration may be employed according to the invention, provided the mass of the paddle is maintained small. Ideally the weight of the paddle is made substantially equal to the weight of the liquid displaced by the paddle. As shown in Figs. 1 and 2, the outer ends of caps 22 are purposely spaced a short distance from the adjacent inner surfaces of plate 15 defining the ends of slot 16, and the longitudinal edges of the paddle are spaced a short distance from the inner surfaces of plate 15 forming the longitudinal edges of slot 16. According to this structure, the paddle is free to pivot or rotate about its center in a plane parallel to the front and rear walls 14 of the container. The orifices 23 between the ends of the paddle and plate 15, and the parallel slots 24 between the longitudinal edges of the paddle and plate 15 coact with the walls of the container and loop to provide the desired damping effect. Thus, when the instrument is subjected to angular acceleration, the motion of the liquid in the container is damped by viscous drag of the liquid in the container and the energy loss in passing through the orifice.

The paddle 20 is mounted so as to pivot on a central axis normal to the front and rear walls 14 of the container, and to the longitudinal axis of the paddle. The pivoted mounting shown in Fig. 1 consists of the brackets 28 having angularly placed lugs 29. Secured to the angular lugs 29 by means of screws 30 is a V-shaped spring 31, for example, beryllium copper, having a planar base 32, the angles formed by the legs 33 of the spring and its base being equal. An insulator ring 36 is positioned between the spring 31 and each of the brackets 28. The base of the spring is fixedly disposed in a V-shaped lug 34 connected to the center of paddle 20. The paddle can thus pivot about the aforementioned central axis. The angular motion of the paddle is limited by means of two motion stop screws 35 which may be adjusted on the brackets 28.

Brackets 28 are each mounted in container 10 on the threaded portion of an adjustable shaft 38 having a collar 39 adjacent the threaded portion, which collar is positioned in an aperture 40 of the bottom 11 and sealed therein by means of an O-ring 41. The outer end of each of shafts 38 protruding from the bottom of the container is positioned within a shaft lock assembly 42 including a bracket 43 suitably secured to the bottom of the container and a locking member 44 mounted on the outer surface of the bracket. Mounted on the end of the threaded portion of each of shafts 38 is a permanent magnetic electrical contact 45.

A solenoid 48 is positioned inside the container on the inner surface of bottom 11 adjacent the central lug 34 of the paddle. The solenoid core 49 has a notch 50 at one end thereof adapted to mate with the lug 34, and the notched portion of the core is restrained against contact with such lug by a spring 51 to which the core is connected, the spring being disposed between the solenoid coil 52 and the bottom of the solenoid. A pair of terminals 53 and 54 are positioned in the bottom wall 11, terminal 53 being electrically connected by means of a lead 55 to the adjacent end of spring 31, and terminal 54 being connected by means of a lead 58 to the solenoid coil 52, the other end of which is electrically connected to the case 10 by means of a lead 56 attached to a screw terminal 57 threadably engaged in bottom 11. Secured to one of the side walls 13 of the case is a ground lug 59.

Mounted on the opposite side of the paddle 20 from lug 34 is an armature 62 of a material having suitable magnetic permeability as, for example, an iron armature. The armature is in the form of a plate which extends across the axis of rotation of the paddle 20.

Supported above the armature from the top of wall 12 and insulated therefrom is a transducer 61 including an iron E-core member 64 having pole pieces 65, 66 and 67, the core being so positioned that the pole pieces are spaced from the armature 62. The core legs 65 and 67 have positioned theron coils 68 and 69 operatively connected by conductors 70 to terminals 71 positioned in the upper wall 12 of the container, these terminals in turn being connected in a conventional Wheatstone bridge circuit (not shown), the output of which is fed to the automatic pilot controller, as described more fully hereinafter.

It will be observed that rotation of the container 10, upon an axis normal to front and rear walls 14 and approximately centrally thereof, deflects the container, causing the armature 62 to approach one of the pole pieces, for example 65, and depart from the pole piece 67, changing the air gap at the pole faces. This increases the reluctance in the magnetic path about the coil 69 and decreases the reluctance in the magnetic path about coil 68. The resultant change in the inductance of the two coils may be measured by any conventional means and related to the angular motion of the paddle, as will be understood by those skilled in the art.

Tubing 75 in the form of an essentially rectangular upwardly extending planar loop which is open at the bottom, is threadably secured at its opposite open ends 76 in the opposite side walls 13 of the container 10 so that the tube communicates with the interior of the container. The lower horizontal end portions 77 of the tube are preferably located on an axis parallel to the axis of paddle 20 when in its undeflected position as shown in Fig. 1 and the plane of the loop is preferably located normal to the axis of rotation of the paddle. The loop 75 may have a shape different from the essentially rectangular shape shown, e.g., circular or elliptical, provided that it is symmetrical.

The interior of case 10 may be filled with liquid through an opening 78 stoppered by a plug 79, and the fluid enters and fills the entire inner chamber of the container and the tubing 75. A suitable means such as a sylphon bellows 80 with a fine orifice plate 80' may be connected in a convenient place to the instrument, e.g., the outer wall 13 of the case in communication with the interior thereof, to provide for expansion of the liquid therein due to temperature rise and the like.

The liquid employed may be any liquid but, preferably, I select one having a high density and low viscosity or a high viscosity and low density to give the desired damping effect. While I may choose from a wide variety of liquids, I prefer to employ a liquid having a low viscosity temperature susceptibility and preferably also one having a low value of temperature coefficient of cubical expansion. A particularly useful liquid is the synthetic silicone polymers which have flat viscosity-temperature lines on the A.S.T.M. chart. The liquids I employ have good insulating properties.

Case 10 is constructed of a conducting material, e.g., a metal. All of terminals 53, 54 and 71 are insulated from the walls of container 10; shafts 38 and their lock assemblies 42 are conductive members; and spring 31, paddle 20 and lug 34 thereof are made of electrically conductive materials. Tubing 75 is preferably composed of a metal.

Referring to Fig. 3, there is shown a schematic wiring diagram of a circuit in which the device of Figs. 1 and 2 may be employed. The output of the bridge circuit 72 to which the accelerometer terminals 71 are electrically connected is fed by means of leads 82 to the terminals 83 of an automatic airplane pilot controller 84.

The signal is transmitted as a voltage which is proportional to the acceleration. This automatic pilot controller, as conventional, controls a servo-mechanism system which actuates through the automatic pilot the necessary controls to maneuver the airplane, and when the maneuver which gave rise to the acceleration has been overcome the output of the bridge 72 is reduced to zero. The servo mechanism responds accordingly. A suitable automatic pilot and pilot control mechanism which may be employed in the invention system disclosed herein is described and shown in "Aircraft Instrument Design" by W. H. Coulthard, Pitman Publishing Corporation, New York, 1952, chapter 18, and particularly Figures 149, 150(a) and 150(B) therein.

The pilot controller 84 normally operates through a circuit including terminals 85, leads 86 and 87 and a switch arm 88 of a control relay 89, such arm normally being held in contact with terminals 90 by a spring (not shown). The switch control of the invention device is connected by means of terminal 53 and lead 93 to the control relay coil 94 of control relay 89, such coil being connected by means of lead 95 to one terminal of the battery 96, the other terminal of which is grounded. Terminal 54 of the device is connected by means of lead 97 to a reset switch 98 in turn connected in parallel to battery 96. The reset switch, which is in the pilot's compartment, is normally maintained open by suitable means such as a spring (not shown). Connected to terminals 99 by means of electrical leads 100 is a warning device 101, e.g., in the form of a bell, red light, or other suitable warning means, one terminal of which is grounded, the other being connected by means of lead 102 to lead 93. This warning circuit is closed when a current flows through coil 94 of control relay 89, causing switch arm 88 of the control relay to be brought into contact with terminals 99.

The device operates as follows:

When the instrument shown in Figs. 1 and 2 is subjected to an angular acceleration about an axis normal to walls 13 and 14 thereof, the liquid in the tubing loop 75 tends to flow in one direction or the other, depending on the direction of acceleration and rotation of container 10. It will be seen under these conditions that the pressure at one side of the paddle 20 is greater than that at the other side. The paddle then deflects or pivots due to this pressure difference until the torque resulting from the pressure difference is balanced by the torque in the spring 31 resulting from the deflection. The deflection of the paddle is directly proportional to the angular acceleration.

Transducer 61 measures the paddle displacement by producing a voltage output in the Wheatstone bridge circuit which is directly proportional to the displacement, and thus provides an output voltage which is directly proportional to the angular acceleration.

The position of the magnetic contacts 45 are adjusted relative to the paddle 20 so that at any predetermined acceleration, which may be considered dangerous, the paddle will touch one or the other of such contacts. Thus, should the aircraft be subjected to a dangerous angular acceleration about any chosen axis, the resulting pressure of the liquid mass flowing in tubing 75 will be so great as to cause the paddle 20 to touch one of the contacts 45, restraining the paddle from further motion by the magnetic holding power of the contact. This closes the switch control circuit of the invention through switch terminal 53, lead 55, spring 31, lug 34, paddle 20, contact 45, shaft 38, lock assembly 42, case 10 and the ground lug 59, causing current to flow in this circuit by means of battery 96, lead 95, control relay coil 94 and lead 93. Passage of current through coil 94 urges the switch arm 88 of the control relay 89 out of contact with terminals 90 and into contact with terminals 99. This cuts off the automatic pilot controller and the automatic pilot, and closes the warning circuit through arm 88, contacts 99, leads 100, lead 102, lead 93, relay coil 94 and battery 96. This energizes the warning device 101, alerting the pilot through the alarm registered by such device.

When the pilot has taken the necessary actions to correct the dangerous maneuver which produced the acceleration conditions, he can again put the system into normal operation under the control of the automatic pilot by momentarily manually closing the reset switch 98. This momentarily energizes the solenoid 48 through a circuit including the battery 96, switch 98, lead 97, terminal 54, lead 58, solenoid coil 52, lead 56, terminal 57 and case 10. Energization of solenoid 48 lifts the solenoid core 49 to bring the notch 50 thereof into engagement with the mating lug 34 on paddle 20, and urging the paddle out of engagement with the contact 45 holding the paddle. This separation of paddle 20 from the contact opens the aforementioned switch control circuit causing a cessation of current flow through control relay 94, resulting in the withdrawal of switch arm 88 of control relay 89 from contact with terminals 99, and engagement of the switch arm with terminals 90 by the action of the control relay spring. Thus, the automatic pilot controller circuit including terminals 85, leads 86 and 87, terminals 90 and switch arm 88 is again closed to place the automatic pilot controller and automatic pilot once more in operation under the control of the invention device.

The invention system thus performs two functions. First, it provides a signal proportional to the angular acceleration of the aircraft which is used by the automatic pilot to control flight under normal conditions Second, under angular accelerations of dangerous magnitude, the automatic pilot is de-activated and an alarm sounded. While the preferred device is one which provides these interrelated dual functions, as above described, the individual mechanism which performs each of these functions is also within the purview of this invention. Hence, either of such functions can be provided separately by either omitting the transducer motion sensing means and related circuitry of the previously described device, or by omitting the switch control including the magnetic contacts and their associated circuitry, the resulting mechanisms being considered a part of this invention.

In place of the inductive motion sensing means or transducer 61 described herein, it will be understood that I may use any other suitably designed transducer such as an electrical resistant strain gage illustrated in my co-pending application Serial No. 241,539, filed August 13, 1951, or other equivalent devices.

The accelerometer-switch device of the invention, when employed for controlling the automatic pilot of an aircraft as described above, may be mounted for operation about one or each of the three major axes of the aircraft. Thus, as illustrated in Fig. 4, the device may be positioned for rotation about the Z-axis of the craft with the tubing loop 75 in the horizontal X—Y plane to provide a yaw-sensitive installation, that is, an installation sensitive to angular acceleration of the craft about the Z-axis, which is normal to the X—Y plane. In Fig. 5 the invention device is shown positioned along the X-axis of the craft with the tube 75 in the vertical transverse Y—Z plane, to provide a roll-sensitive installation, wherein angular acceleration of the craft about the X-axis is registered. Also as illustrated in Fig. 6, the invention device may be disposed for rotation about the Y-axis, the tubing 75 being positioned in the vertical longitudinal X—Z plane to afford a pitch-sensitive installation, or one which is sensitive to angular acceleration of the craft about the Y-axis.

While I have shown and described the positioning of my accelerometer and switch substantially on the principal axes of an aircraft, it is understood, of course, that my device need not be located directly on these axes in order to be sensitive to acceleration thereabout. It is only necessary that acceleration of the craft about one of its axes produce an acceleration of my device about its axis. Thus, the device herein can be positioned off to a side of a principal axis of the craft and still remain operative and responsive to acceleration about such axis.

While I have described a particular embodiment of my invention for the purpose of illustration, it should be understood that various modifications and adaptations thereof may be made within the spirit of the invention as set forth in the appended claims.

I claim:

1. A motion sensing device which comprises a closed chamber, an elongated member pivotally mounted for limited angular motion within said chamber, a motion sensing means operatively associated with said member to sense the angular displacement thereof, a control means actuated in response to said motion sensing means, a pair of magnetic electrical contacts each positioned adjacent and spaced from said elongated member, said contacts being respectively located on opposite sides of the pivot point for said member, means connected to each of said contacts for discontinuing operation of said control means when said member has pivoted into holding engagement with one of said contacts corresponding to a predetermined amount of angular motion of said member, and circuit means for withdrawing said member from said engaged contact, said circuit means including a switch and a solenoid, said solenoid being energized and urging said member away from said engaged contact on actuation of said switch.

2. A motion sensing device which comprises a closed chamber, an elongated member pivotally mounted for limited angular motion within said chamber, a motion sensing means operatively associated with said member to sense the angular displacement thereof, a vehicle control means actuated in response to said motion sensing means, a pair of magnetic electrical contacts each positioned adjacent and spaced from said elongated member, said contacts being respectively located on opposite sides of the pivot point for said member, means connected to each of said contacts for discontinuing operation of said control means when said member has pivoted into holding engagement with one of said contacts corresponding to a predetermined amount of angular motion of said member, said last named means comprising an electrical circuit including said contacts, an alarm device in said circuit, said circuit closing and actuating said alarm device when said elongated member engages one of said contacts, and circuit means for withdrawing said member from said engaged contact, said circuit means including a switch and a solenoid, said solenoid being energized and urging said member away from said contact on actuation of said switch.

3. A motion sensing device which comprises a closed chamber, an elongated member pivotally mounted for limited angular motion within said chamber, a motion sensing means operatively associated with said member to sense the angular displacement thereof, a vehicle control actuated in response to said motion sensing means, said control means including an electrical circuit having a control relay therein, a pair of magnetic electrical contacts each positioned adjacent and spaced from said elongated member, said contacts being respectively located on opposite sides of the pivot point for said member, an electrical circuit connected to each of said contacts and including said control relay, said last named circuit closing and actuating said relay to open said first named circuit and discontinue operation of said control means when said member has pivoted into holding engagement with one of said contacts corresponding to a predetermined amount of angular motion of said member, and circuit means for withdrawing said member from said engaged contact, said circuit means including a switch and a solenoid, said solenoid being energized and urging said member away from said contact on actuation of said switch.

4. A motion sensing device, comprising a closed chamber, liquid in said chamber, a paddle immersed in said liquid, a hinge for said paddle, said paddle being pivotally mounted about said hinge for limited angular motion of said paddle, the opposite ends of said paddle being disposed adjacent opposing wall sections of said chamber, motion sensing means associated with said paddle to sense the angular displacement thereof, a control means actuated in response to said motion sensing means, and means cooperating with said paddle for discontinuing operation of said control means when said paddle has pivoted a predetermined amount, said last-named means including a switch comprising a contact positioned adjacent said paddle and adapted to engage said paddle on pivotal movement thereof for said predetermined amount.

5. A motion sensing device, comprising a closed chamber, liquid in said chamber, a paddle immersed in said liquid, a hinge for said paddle, said paddle being pivotally mounted about said hinge for limited angular motion of said paddle, the opposite ends of said paddle being disposed adjacent opposing wall sections of said chamber, at least one of the outer edges of the paddle being positioned close to its adjacent wall section to form a fluid communicating passageway between said paddle edge and said wall section, a length of tubing in the form of a loop connected to and communicating with said chamber, liquid in said tubing, motion sensing means associated with said paddle to sense the angular displacement thereof, a control means actuated in response to said motion sensing means, and means cooperating with said paddle for discontinuing operation of said control means when said paddle has pivoted a predetermined amount.

6. A motion sensing device, comprising a closed chamber, a liquid in said chamber, a paddle immersed in said liquid, a hinge for said paddle, said paddle being pivotally mounted about said hinge for limited angular motion of said paddle, the opposite ends of said paddle being disposed adjacent opposing wall sections of said chamber, at least one of the outer edges of the paddle being positioned close to its adjacent wall section to form a fluid communicating passageway between said paddle edge and said wall section, a length of tubing in the form of a loop connected to and communicating with said chamber, liquid in said tubing, a motion sensing means operatively associated with said paddle to sense the angular displacement thereof, a control means actuated in response to said motion sensing means, a pair of magnetic electrical contacts each positioned adjacent and spaced from said paddle, said contacts being respectively located on opposite sides of the pivot point for said paddle, means connected to each of said contacts for discontinuing operation of said control means when said paddle has pivoted into holding engagement with one of said contacts corresponding to a predetermined amount of angular motion of said paddle, and circuit means for withdrawing said paddle from said engaged contact, said circuit means including a switch and a solenoid, said solenoid being energized and urging said paddle away from said contact on actuation of said switch.

7. A motion sensing device comprising a closed chamber, liquid in said chamber, a paddle immersed in said liquid, a hinge for said paddle, said paddle being pivotally mounted about said hinge for limited angular motion of said paddle, the opposite ends of said paddle being disposed closely adjacent opposing wall sections of said chamber forming liquid communicating passageways between the outer edges of said paddle and the respective adjacent wall sections of said chamber, a length of tubing in the form of a loop connected to and communicating with said chamber, said loop being in a plane normal to the pivotal axis of said paddle, liquid in said tubing, a motion sensing means operatively associated with said paddle to sense the angular displacement thereof, a control means actuated in response to said motion sensing means, an electrical contact positioned adjacent and spaced from said paddle, and means connected to said contact for discontinuing operation of said control means when said paddle has pivoted into engagement with contact corresponding to a predetermined amount of angular motion of said paddle.

8. A motion sensing device, comprising a closed chamber, liquid in said chamber, a paddle immersed in said liquid, a hinge for said paddle, said paddle being pivotally mounted about said hinge for limited angular motion of said paddle, the opposite ends of said paddle being disposed closely adjacent opposing wall sections of said chamber, forming liquid communicating passageways between the outer edges of said paddle and the respective adjacent wall sections, a length of tubing in the form of a symmetrical loop connected to and communicating with said chamber, said loop being in a plane normal to the pivotal axis of said paddle, liquid in said tubing, a motion sensing means operatively associated with said paddle to sense the angular displacement thereof, an automatic pilot controller actuated in response to said motion sensing means, said pilot controller including an electrical circuit having a control relay therein, a pair of magnetic electrical contacts each positioned adjacent and spaced from said paddle, said contacts being respectively located on opposite sides of the pivot point for said paddle, an electrical circuit connected to each of said contacts and including said control relay, said last named circuit closing and actuating said relay to open said first named circuit and discontinue operation of said pilot controller when said paddle has pivoted into holding engagement with one of said contacts corresponding to a predetermined amount of angular motion of said paddle, and circuit means for withdrawing said paddle from said engaged contact, said circuit means including a switch and a solenoid, said solenoid being energized and urging said paddle away from said contact on actuation of said switch, an alarm device in said second mentioned circuit, said alarm device being actuated when said second mentioned circuit is closed on engagement of said paddle with one of said contacts.

9. A motion sensing device, comprising a closed chamber, liquid in said chamber, a paddle immersed in said liquid, a hinge for said paddle, said paddle being pivotally mounted about said hinge for limited angular motion of said paddle, the opposite ends of said paddle being disposed adjacent opposing wall sections of said chamber, at least one of the outer edges of the paddle being positioned close to its adjacent wall section to form a fluid communicating passageway between said paddle edge and said wall section, a length of tubing in the form of a loop connected to and communicating with said chamber, liquid in said tubing, and motion sensing means associated with said paddle to sense the angular displacement thereof.

10. A motion sensing device, comprising a closed chamber, liquid in said chamber, a paddle immersed in said liquid, a hinge for said paddle, said paddle being pivotally mounted about said hinge for limited angular motion of said paddle, the opposite ends of said paddle being disposed closely adjacent opposing wall sections of said chamber, forming liquid communicating passageways between the outer edges of said paddle and the repective adjacent wall sections, a length of tubing in the form of a symmetrical loop connected to and communicating with said chamber, said loop being in a plane normal to the pivotal axis of said paddle, liquid in said tubing, and motion sensing means operatively associated with said paddle to sense the angular displacement thereof.

11. Apparatus which comprises an elongated member mounted for pivotal movement intermediate its ends for limited angular motion of said member, a control means, a pair of magnetic electrical contacts each positioned adjacent and spaced from said elongated member, said contacts being respectively located on opposite sides of the pivot point for said member, means connected to each of said contacts for discontinuing operation of said control means when said member has pivoted into holding engagement with one of said contacts corresponding to a predetermined amount of angular motion of said member, and circuit means for withdrawing said member from said engaged contact, said circuit means including a switch and a solenoid, said solenoid being energized and urging said member away from said engaged contact on actuation of said switch.

12. Apparatus which comprises an arm mounted for pivotal movement intermediate its ends for limited angular motion of said arm, an automatic pilot controller, said controller including an electrical circuit having a control relay therein, a pair of magnetic electrical contacts each positioned adjacent and spaced from said arm, said contacts being respectively located on opposite sides of the pivot point of said arm, an electrical circuit connected to each of said contacts and including said control relay, said last named circuit closing and actuating said relay to open said first named circuit and discontinue operation of said pilot controller, when said arm has pivoted into holding engagement with one of said contacts corresponding to a predetermined amount of angular motion of said arm, and circuit means for withdrawing said arm from said engaged contact, said circuit means including a switch and a solenoid, said solenoid being energized and urging said arm away from said contact on actuation of said switch.

13. In combination with an aircraft having an automatic pilot, a motion sensing device as defined in claim 1, said device being operatively positioned in said aircraft for sensing angular acceleration about one of the three major axes of said aircraft, said automatic pilot being operatively connected to said control means for actuation in response thereto.

14. In combination with an aircraft having an automatic pilot, a motion sensing device as defined in claim 4, said device being operatively positioned in said aircraft for sensing angular acceleration about one of the three major axes of said aircraft, said automatic pilot being operatively connected to said pilot controller for actuation in response thereto.

15. In combination with an aircraft having an automatic pilot, three motion sensing devices as defined in claim 1, each of said devices being respectively operatively positioned in said aircraft for sensing angular acceleration about a different one of the three major axes of said aircraft, said automatic pilot being operatively connected to said control means of each of said devices for actuation in response thereto.

16. In combination with an aircraft having an automatic pilot, a mechanism as defined in claim 11, said automatic pilot being operatively connected to said control means for actuation in response thereto.

17. A motion sensing device, comprising a closed chamber, liquid in said chamber, a paddle immersed in said liquid, a hinge for said paddle, said paddle being pivotally mounted about said hinge for limited angular motion of said paddle, the opposite ends of said paddle being disposed adjacent opposing wall sections of said chamber, at least one of the outer edges of the paddle being positioned close to its adjacent wall section to form a fluid communicating passageway between said paddle edge and said wall section, a length of tubing in the form of a loop connected to and communicating with said chamber, liquid in said tubing, and means associated with said paddle and operative in response to pivotal movement of said paddle a predetermined amount.

18. A motion sensing device which comprises a closed chamber, an elongated member pivotally mounted for limited angular motion within said chamber, a motion sensing means operatively associated with said member to sense the angular displacement thereof, a control means actuated in response to said motion sensing means, an electrical magnetic contact positioned adjacent said elongated member, means connected to said contact for discontinuing operation of said control means when said member has pivoted into holding engagement with one of said contacts corresponding to a predetermined amount of angular motion of said member, and circuit means for withdrawing said member from said engaged contact, said circuit means including a switch and a solenoid, said solenoid being energized and urging said member away from said engaged contact on actuation of said switch.

19. A motion sensing device comprising a closed chamber, liquid in said chamber, a paddle immersed in said liquid, a hinge for said paddle, said paddle being pivotally mounted about said hinge for limited angular motion of said paddle, the opposite ends of said paddle being disposed adjacent opposing wall sections of said chamber, a control means, and means cooperating with said paddle for discontinuing operation of said control means when said paddle has pivoted a predetermined amount, said last-named means including a switch comprising a contact positioned adjacent said paddle and adapted to engage said paddle on pivotal movement thereof for said predetermined amount.

20. In combination with an aircraft having an automatic pilot, a motion sensing device as defined in claim 19, said device being operatively positioned in said aircraft for sensing angular acceleration about one of the three major axes of said aircraft, said automatic pilot being operatively connected to said control means for actuation in response thereto.

References Cited in the file of this patent

UNITED STATES PATENTS

| | | |
|---|---|---|
| 1,626,567 | Steinbrecht | Apr. 26, 1927 |
| 2,225,716 | Sexton | Dec. 24, 1940 |
| 2,322,003 | Farmer | June 15, 1943 |
| 2,450,427 | Halpert | Oct. 5, 1948 |
| 2,487,793 | Esval | Nov. 15, 1949 |
| 2,488,286 | Glenny | Nov. 15, 1949 |
| 2,659,041 | Kutzler | Nov. 10, 1953 |
| 2,672,334 | Chenery | Mar. 16, 1954 |
| 2,778,624 | Statham | Jan. 22, 1957 |
| 2,778,905 | Statham | Jan. 22, 1957 |

FOREIGN PATENTS

| | | |
|---|---|---|
| 446,230 | Great Britain | Apr. 27, 1936 |
| 625,511 | Great Britain | June 29, 1949 |